United States Patent [19]

Zezza

[11] 4,187,433
[45] Feb. 5, 1980

[54] HIGH DENSITY FUEL STORAGE RACK

[75] Inventor: Louis J. Zezza, Ossining, N.Y.

[73] Assignee: Automation Industries, Inc., Los Angeles, Calif.

[21] Appl. No.: 822,084

[22] Filed: Aug. 5, 1977

[51] Int. Cl.² ............................................. G21F 5/00
[52] U.S. Cl. .................................... 250/507; 250/506
[58] Field of Search ............... 250/506, 507, 515, 518; 176/87, 28

[56] References Cited

U.S. PATENT DOCUMENTS

| | | |
|---|---|---|
| 4,029,968 | 6/1977 | Rubinstein et al. ................. 250/507 |
| 4,042,828 | 8/1977 | Rubinstein et al. ................. 250/507 |
| 4,044,267 | 8/1977 | Beuilacqua ........................ 250/507 |

Primary Examiner—Bruce C. Anderson
Attorney, Agent, or Firm—Thomas L. Flattery

[57] ABSTRACT

High storage density for spent nuclear fuel assemblies in a pool achieved by positioning fuel storage cells of high thermal neutron absorption materials in an upright configuration in a rack. The rack holds the cells at required pitch. Each cell carries an internal fuel assembly support, and most cells are vertically movable in the rack so that they rest on the pool bottom. Pool water circulation through the cells and around the fuel assemblies is permitted by circulation openings at the top and bottom of the cells above and below the fuel assemblies.

13 Claims, 6 Drawing Figures

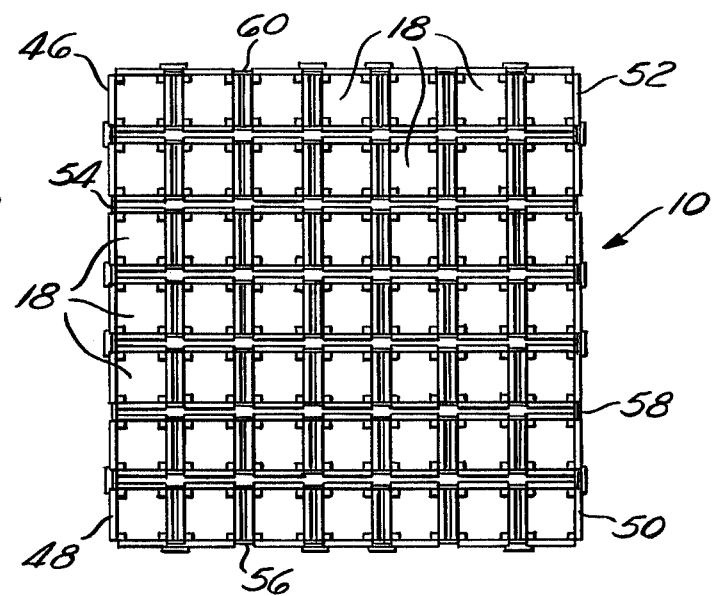
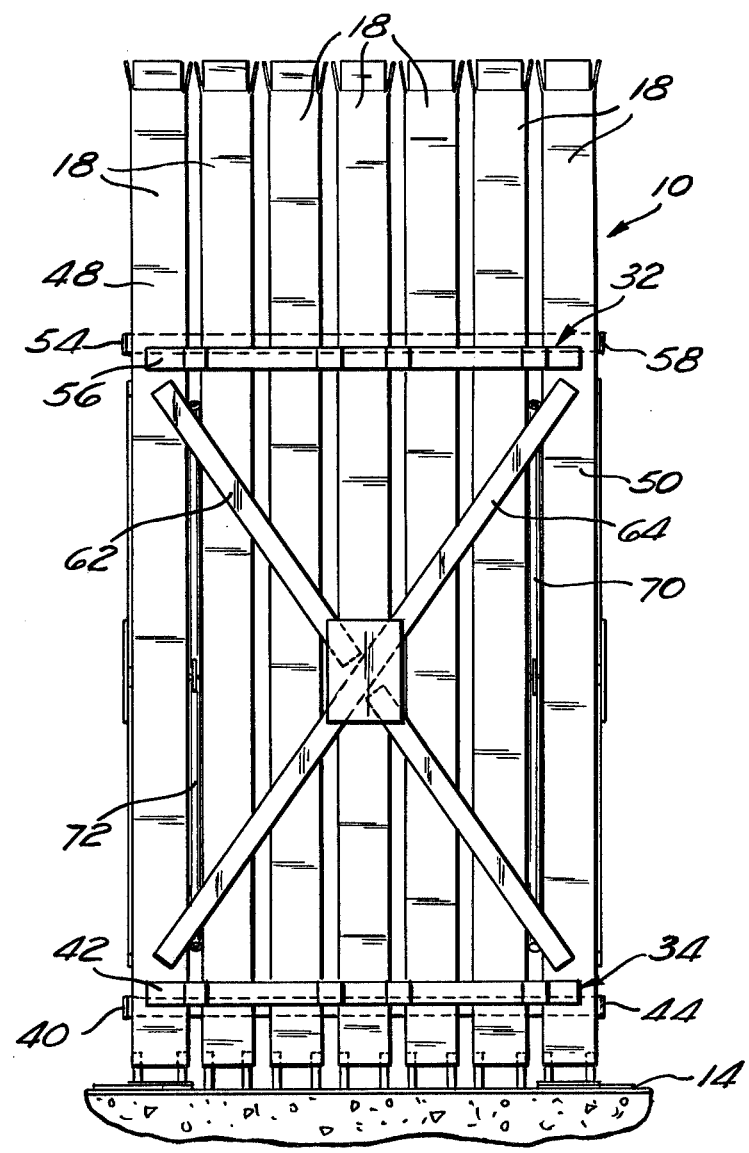

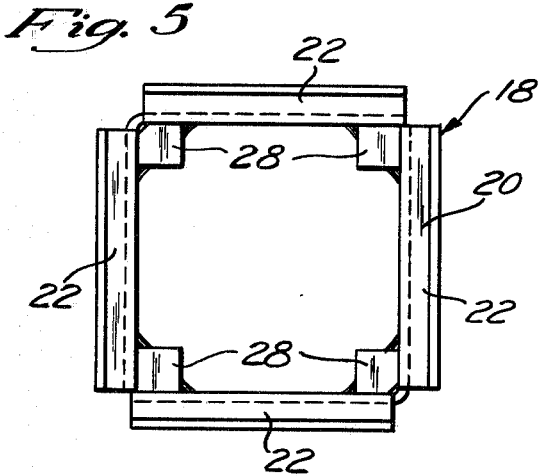
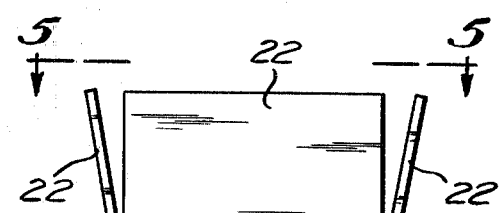
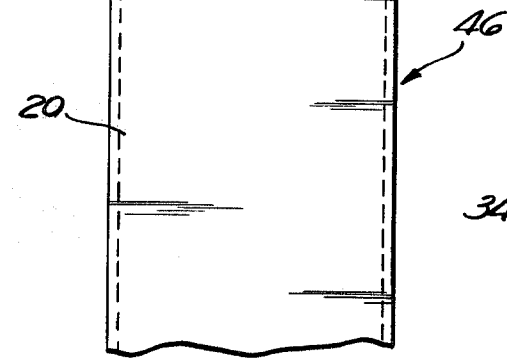
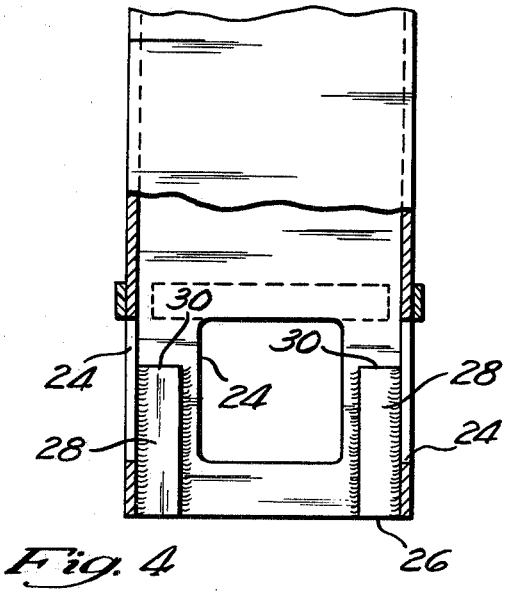
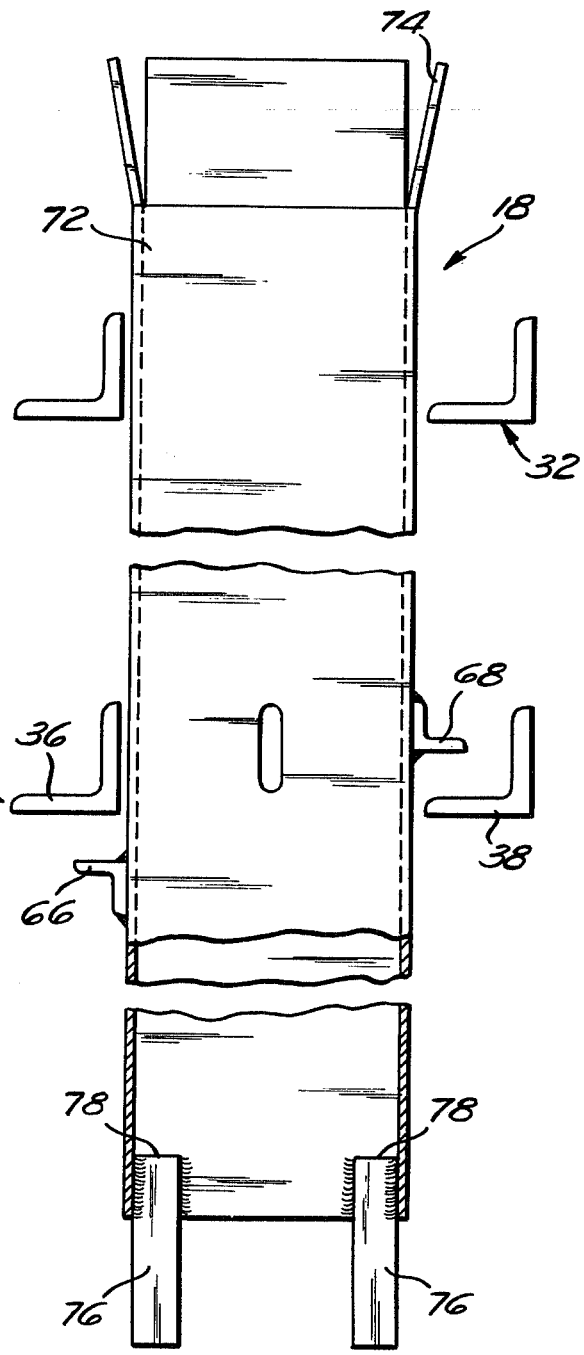
Fig. 5
Fig. 4
Fig. 6

HIGH DENSITY FUEL STORAGE RACK

BACKGROUND OF THE INVENTION

This invention is directed to a storage rack for the high density storage of spent nuclear fuel assemblies.

Each nuclear electric generating station must safely store its spent fuel assemblies. At one time, it was expected that these fuel assemblies would be stored at the site of the generating station only a short time before the assemblies were shipped to a central plant for reprocessing. However, there are no reprocessing plants in operation to date, therefore, the spent fuel assemblies have to be stored at the power plant site. It has been thought that such shipment would endanger the public in case of accident. For the storage of spent nuclear fuel assemblies, each nuclear powered electric generation station has on its site a spent fuel pool. This is a water-filled pool into which the spent fuel assemblies are placed for storage. The water serves as a coolant and also serves as a radiation shield so that the radiation level around the pool is sufficiently low as to be safe for workers in that area. A particular advantage of water is that it is transparent so that the pool can be inspected while the radiation shielding and cooling functions are fully effective.

With the requirement for more spent fuel assembly storage capacity, higher density storage is required. Some attempts at fuel assembly and storage rack design have resulted in vertical placement of the spent fuel assemblies in a rack structure which utilizes a continuous integral support base on which the fuel assemblies rest. These designs transfer the vertical loads to the pool floor at just a few locations, and since the vertical loads are significant, the rack structure has to be substantial to carry the load to the floor.

SUMMARY OF THE INVENTION

In order to aid in the understanding of this invention, it can be stated in essentially summary form that it is directed to a high density nuclear fuel assembly storage rack wherein fuel storage cells are upright-oriented and are spaced at desired pitch in generally horizontal grids. The grids are structurally supported with respect to each other to maintain rectangular configuration, and most of the fuel storage cells are vertically movable in the grids so that they can individually rest on the pool floor. The material of the cells, together with the wall thickness and the spacing therebetween, maintain interaction between the fuel assemblies below the critical value.

It is thus an object of this invention to provide a high density nuclear fuel assembly storage rack which is capable of storing spent nuclear fuel assemblies at a high density in a spent fuel pool. It is another object to provide a storage rack with upright orientation of fuel storage cells so that fuel assemblies may stand on end in the cells for minimizing lateral, axial and bending loads in the fuel assembly structure during handling and storage. It is another object to provide a spent nuclear fuel storage rack which prevents the insertion of fuel assemblies in other than prescribed locations and provides adequate clearances and lead-in capability to permit fuel assembly in other than prescribed locations and provides adequate insertion and removal without jamming, hanging up, or damaging the fuel assembly. It is a further object to provide a fuel storage cell wherein the fuel assembly is completely enclosed within the cell and does not project underneath or extend above the wall surfaces of the cell for adequate shielding. It is another object to provide a rack which can distribute the load on the pool floor by permitting individual self aligning fuel cells to find support on the floor so that the rack does not have to transmit all of the support loading to the corner feet of the rack. It is a further object to provide an economic fuel storage rack which can be transported in the unassembled condition and assembled at the storage site to reduce shipping costs and ease field installation.

Other objects and advantages of this invention will become apparent from a study of the following portion of the specification, the claims, and the attached drawings.

DESCRIPTION OF THE DRAWINGS

FIG. 2 is a side-elevational view of the high density nuclear fuel assembly storage rack of this invention.

FIG. 3 is a top plan view thereof.

FIG. 4 is a side-elevational view, with parts broken away and parts taken in section, of one of the four corner fuel cells.

FIG. 5 is a plan view thereof.

FIG. 6 is a side-elevational view of one of the storage cells away from the corner position, the plan view thereof being the same as FIG. 5.

DESCRIPTION OF THE SHOWN EMBODIMENT

Figure 1:
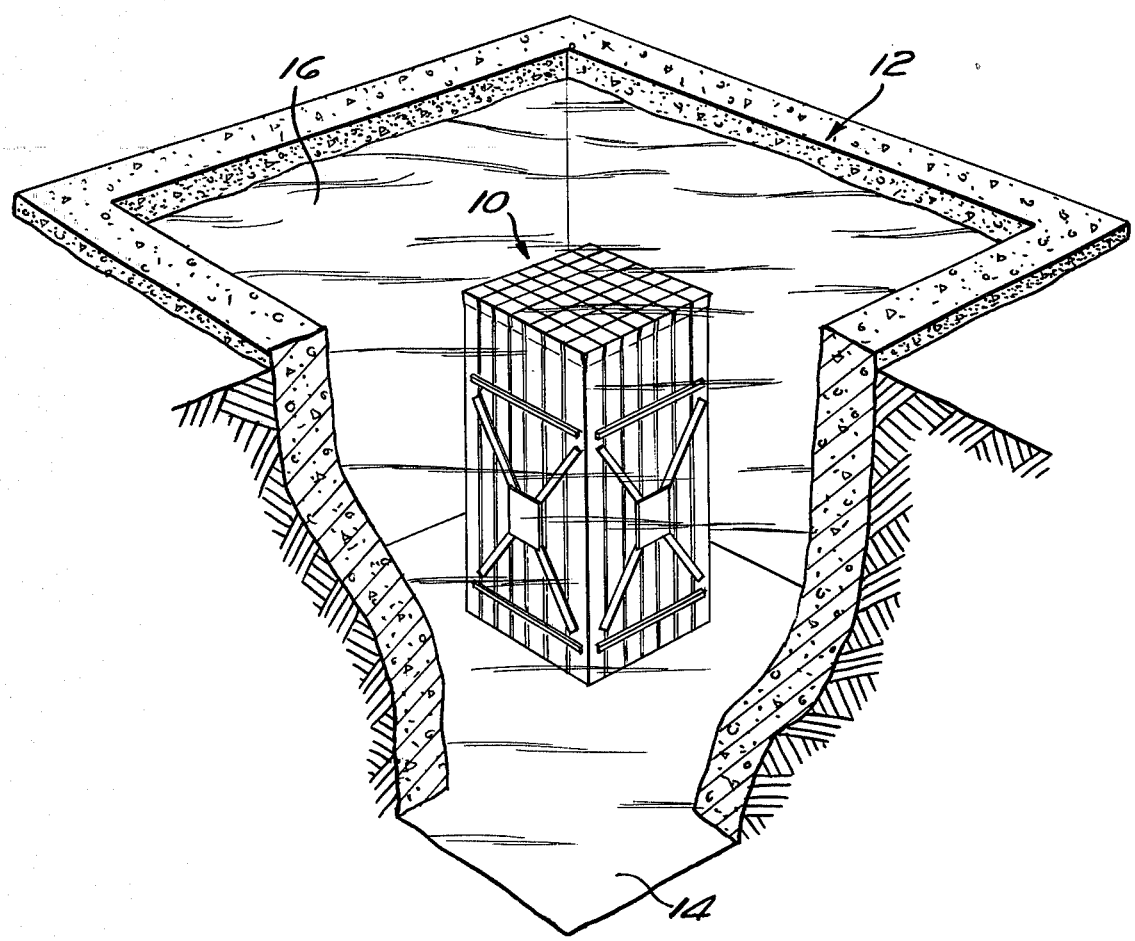
FIG. 1 is an isometric view of a spent nuclear fuel storage pool showing a high density nuclear fuel assembly storage rack of this invention positioned therein.

FIG. 1 illustrates high density nuclear fuel assembly storage rack 10 in pool 12. Pool 12 has side walls and floor 14 to contain water 16 which acts as a coolant and shield for spent nuclear fuel assemblies stored in storage rack 10. Pool 12 may be of sufficient size to hold a plurality of the storage racks 10 so that spent nuclear fuel assemblies can be stored in high density in the spent fuel pool, as well as in high density in the rack, as is hereinafter described.

As seen in FIGS. 2 and 3, there are a plurality of fuel storage cells 18 which form part of the rack 10. As is seen in FIGS. 4 and 5, each of the storage cells 18 comprises a square tube 20. At the top, its corners are slit, and the four walls of the tube are turned slightly outward to form funnel 22. As is seen in FIG. 2, the flared side walls of the funnels do not quite touch the adjacent flared side walls of adjacent fuel storage cells 18. The funnels cover almost the entire top area so that it is difficult to insert anything between the cells 18. Thus, the flared walls of the funnels serve two purposes: To aid in the introduction of a spent fuel assembly down into the cell; and to prevent lowering anything of substantial size into the spaces between the cells.

The structure of the four corner cells 46, 48 and 50 and 52 is shown in FIGS. 4 and 5. At the bottom, each of the four walls of the tube 20 of these cells has a circulation opening 24 therein. These circulations are adjacent to the bottom of the tubular storage cell, but preferably do not reach the bottom surface 26 for strength reasons. Support legs 28 are secured, as by welding, in each of the four lower corners of tube 20. The support legs are flush on their bottom ends with bottom surface 26 to serve as strengtheners, and their top surfaces 30 serve as a supporting surface for the spent nuclear fuel assembly as it is lowered into the fuel storage cell. The top of circulation opening 24 is above the top of the supporting surface 30 on which the nuclear fuel assembly rests, but this does not serve as an open radiation window because the lower end of the fuel assembly is part of the housing which does not contain spent fuel. Furthermore, the fuel storage cell 18 is sufficiently tall that the fuel assembly does not reach up to the bottom of funnel 22 so that the radiating portion of the spent fuel assembly is fully enclosed in the closed portion of tube 20. In addition, the circulation openings 24 are utilized for handling the racks during the remote installation of the racks in the fuel storage pool 12.

The nuclear properties of the fuel storage rack for a given type of fuel assembly are achieved by the spacing or pitch of the cells and the composition of the fuel storage cell walls. The fuel storage cells may be stainless steel, such as type 304 of a specified wall thickness, typically between 0.090 and 0.250 inch or may be a combination of stainless steel and a thermal neutron poison material, for example, boron carbide. Fuel storage racks can be fabricated of aluminum, when a thermal neutron poison is employed. However in the preferred embodiment, fuel storage cells 18 and 46 are made out of type 304 stainless steel with an appropriate wall thickness for a 12 inch typical pitch.

As seen in FIGS. 2 and 3, fuel storage cells 18, 48, 50 and 52 are supported in a 7×7 module by means of horizontal grids 32 and 34. Each of the horizontal grids is formed of angle irons, as for example, the angle irons 36 and 38 shown in FIG. 6 as a detailed portion of grid 34. Outer straps 40, 42 and 44, as well as a strap across the back are secured to the corner fuel cells 46, 48, 50 and 52 adjacent to the bottom to form the exterior of horizontal grid 34. Angle irons extend transversely between these straps in order to form the 7×7 grid pattern. Similarly, at top grid 34, outer straps 54, 56, 58 and 60 form the periphery of the grid and are secured to the four corner fuel cells. Angle irons join these outer straps to also define the 7×7 fuel cell grid. Diagonal straps 62 and 64, see FIG. 2, as well as identical straps on the other four sides make rigid the structure of the four corner fuel cells and the two grids 32 and 34. All straps and angle irons are secured by welding.

As seen in FIG. 6, each of the interior fuel storage cells 18 is of such size that it is freely movable up and down within limits within the horizontal grids. Stop shoulders 66 and 68 are respectively spaced below and above the angle irons 36 and 38 which form part of the lower horizontal grid, 34. Thus, the cell shown in FIG. 6 and all of the other cells in the storage rack except for the corner cells are vertically slidable within limits within the storage rack. In this way, they can each rest directly on the pool floor 14 so that the individual storage cell loads are each supported on the floor. In this way, the storage rack structure itself does not have to transfer the total rack load to the pool floor. Stop shoulders 66 and 68 are provided to permit handling of the storage rack 10 as a unit and to prevent excessive vertical motion.

Since the spent fuel assembly storage cell illustrated in FIG. 4 is one of the corner cells, it is indicated as being corner 46, although each of the corner cells is the same. One of the differences between the cells is the fact that the tube 20 of the corner cell goes all the way down to the floor. If desired, it can have a load spreading pad secured thereto. It preferably rests on a pad on the pool floor. Since the loading of the corner cell may be higher than the interior cells, the construction thereof is stronger at the lower corners by having the tube 20 and the support legs 28 both extend to the bottom surface 26. In addition to the exterior diagonal bracing represented by straps 62 and 64 and the similar straps all the way around rack 10, there can be diagonal bracing also on the inside. For example, diagonally oriented tubes 70 and 72 (see FIG. 2) are positioned interiorly of the exterior diagonal straps and are secured on their ends to the corner cells. This further rigidizes the structure represented by the corner cells, the diagonals and the upper and lower grids 32 and 34.

In the remaining grid spaces, movable fuel cells 18 are positioned. One of the fuel cells 18 is indicated at FIG. 6. Its plan view is similar to FIG. 5. Fuel cell 18 is also formed of square tube 72 which is flared in funnel 74, as previously described. The principal differences between the inner storage cells 18 and the corner cells are in the support structure and the bottom structure. On the bottom, support legs 76 extend below the bottom of tube 70 to define a circulating open area below the bottom of the tube. By this construction, fuel assembly support serface 78 is also formed on the interior of tube 72 above the bottom thereof.

The fuel storage cells 18 are free to slide up and down in the grids within mechanical limits. Stop shoulders 66 and 68 are secured to the sides of tube 72 respectively below and above angle irons 36 and 38 of the lowest horizontal grid 34. In this way, the fuel storage cells 18 can slide up and down within limits. This permits the fuel storage cells 18 to rest on the floor 14 of the pool so that each fuel storage cell and its contained spent fuel assembly are individually supported on the pool floor.

Levelness of the structure is established by embedment pads in the floor of the pool. The resting of the four corner fuel cells on the embedment pads and the leveling of the four corners assures upright positioning of the corner cells. The grid structure rests on these cells so that the openings in the grids and each of the fuel storage cells therein is upright. The necessity for upright fuel storage cells arises from the fact that the fuel assemblies are bundles of fuel rods of little mechanical strength so that they do not have the strength for them to stand alone. They must stand quite upright and supported by the fuel storage cells. The distance between the cells is important to prevent the reaction from becoming critical, and the can spacing is defined by the character of the fuel assembly. Can wall thickness together with its neutron absorption properties are also related parameters.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

I claim:

1. A storage rack for the high density storage of spent nuclear fuel assemblies, said storage rack comprising:

first and second grids, said first and second grids being spaced one above the other so that said first grid is positioned above said second grid, said first and second grids defining vertically aligned openings therethrough; wherein said first and second grids provide an integral support structure for said assemblies;

upright separately, supported tubular storage cells in said openings so that said fuel cells are retained in upright position and are retained spaced from each other so that when said storage rack is immersed in a storage pool spent nuclear fuel assemblies can be placed in said storage cells, most of said cells being contained in said opening from floating movement in a direction normal to said grids.

2. The storage rack of claim 1 wherein said cells are made of material of sufficient radiation absorption and are of sufficient thickness so that said cells can be closely spaced to each other.

3. The storage rack of claim 1 wherein said grids have support cells in selected grid openings, said support cells being secured to said grids so that said support cells support said grids.

4. The storage rack of claim 3 wherein said cells between said support cells are movable in said grids in an upright direction so that said storage cells away from said support cells can be supported by other than said grids.

5. The storage rack of claim 4 wherein said grid is rectangular and diagonal bracing interconnects said support storage cells to strengthen the rectangular structure comprised of said support cells and said grids.

6. The storage rack of claim 5 wherein said support cells are corner cells and said diagonal bracing comprises diagonal bracing exteriorly of said corner cells.

7. The storage rack of claim 5 wherein said support cells are corner cells and said diagonal bracing is positioned interiorly of said corner cells.

8. The storage rack of claim 7 wherein said diagonal bracing also comprises diagonal bracing exteriorly of said corner cells.

9. The storage rack of claim 1 wherein at least three of said storage cells are secured to both of said grids and others of said storage cells are movable in an upright direction with respect to said grids.

10. The storage rack of claim 9 wherein said storage cells are open adjacent the bottom thereof for the circulation of water therethrough.

11. The storage rack of claim 10 wherein the tops of said storage cells are flared to increase the entry opening into said storage cells from above and to decrease the space between said storage cells at entry level thereof.

12. The storage rack of claim 9 wherein said storage cells which are movable with respect to said grids have stops thereon for engagement with at least one of said grids so that the amount of upright motion of said movable storage cells with respect to said grids is limited.

13. The storage rack as defined in claim 1 wherein a cell is provided in each said opening of said grids.

* * * * *